Nov. 26, 1968  M. J. ERISMAN  3,412,845

CONVEYING APPARATUS

Filed Dec. 2, 1966

INVENTOR
MAURICE J. ERISMAN

ATTY

United States Patent Office 3,412,845
Patented Nov. 26, 1968

3,412,845
CONVEYING APPARATUS
Maurice J. Erisman, Oak Park, Ill., assignor to
FMC Corporation, a corporation of Delaware
Filed Dec. 2, 1966, Ser. No. 598,777
9 Claims. (Cl. 198—220)

ABSTRACT OF THE DISCLOSURE

A motor driven oscillating conveyor employing an electrical control circuit for automatically assisting in starting the conveyor and having a reversing switch arranged to energize the motor in a forward direction and responsive to any initial stalling of the motor to effect the reversal thereof, and responsive to any initial stalling of the motor in the reverse direction to deenergize the motor.

BACKGROUND OF THE INVENTION

*Field of the invention.*—This invention relates generally to new and useful improvements in conveying apparatus and more particularly to an apparatus for starting and controlling a motor driven oscillating conveyor.

*Description of the prior art.*—Oscillating conveyors are utilized to move materials in a uniform continuous flow by the oscillating motion in an inclined direction of a trough driven by a mechanism which imparts periodic impulses to the trough to effect the oscillation thereof for advancing the material supported thereon. The trough is supported by longitudinally spaced members having reactor elements associated therewith which are designed such that at the normal operating speed of the conveyor, spring forces are generated by the reactor elements and applied to the oscillating trough. These spring forces reach a maximum at each end of each oscillation. These spring forces are approximately equal to the combined inertia forces of the oscillating conveyor system which consists of the conveyor trough and the weight of the material supported thereon. In this manner the normal operating speed of the conveyor is close to the natural frequency of the oscillating conveying system so that the power requirements of the electric drive mechanism during the running operation of the conveyor are reduced to a minimum.

It is to be noted, however, that initially the conveyor system is supported in a static position by the reactor elements such that the reactor elements have a potential energy which balances the force of gravity acting on the conveyor system. Depending on the arrangement of the drive mechanism, the initial starting force will be imparted to the conveyor system in either an upwardly or downwardly inclined direction. In either case, however, it is required that the drive mechanism supply the necessary power to create a condition of imbalance in the forces applied to the conveyor system by the drive and by the reactor elements and by the force of gravity acting thereon. Since the condition of imbalance is created solely by the drive and must be sufficient to move the conveyor to one end point of an oscillation, the load imposed on the drive mechanism during the starting of the conveyor is much greater than that required to maintain the conveyor oscillating at its normal operating speed, and this must be provided for when selecting the horsepower of the electric motor for the drive mechanism. Normally, the high power demands placed on the motor during the starting of the conveyor requires that the motor be of a substantially larger size than that which is required to merely maintain the normal operating speed of the conveyor. Tests have shown that where an electric motor rated at 15 horsepower is required to start a conveyor oscillating in the usual manner, an electric motor rated at 5 horsepower provides a sufficient amount of power to maintain the conveyor running at the normal operating speed. It is apparent that an apparatus which would permit the starting of an oscillating conveyor with a motor sized for the normal operating speed of the conveyor rather than for the larger starting requirements would provide a less expensive and more efficient drive mechanism. In addition, the larger electric motor would operate at a lower power factor since it would not be operated near its rated power whereas the smaller motor would be operated close to its rated power and therefore at a correspondingly higher power factor, thus eliminating the need for power factor correction equipment which would otherwise be required to compensate for a low power factor.

SUMMARY OF THE INVENTION

In general, this invention provides an apparatus which permits an electric motor with a smaller rated horsepower to be supplied in conjunction with an oscillating conveyor which would otherwise require an electric motor with a larger rated horsepower due to the amount of power required to start the conveyor. This apparatus is designed to energize the motor in one direction, and if the conveyor fails to start within a predetermined period of time the apparatus will then automatically reverse the direction of motor rotation. If the conveyor still fails to start within a predetermined period of time, the apparatus will automatically deenergize the motor. In this manner the reactor elements are allowed to develop spring forces during the attempted start in the first direction, and these forces are then released in a direction to aid the motor in starting the conveyor in the reverse direction. Hence it is seen that the starting power requirement for the conveyor drive motor is greatly reduced and by using this invention a motor just large enough to maintain the conveyor running at the normal operating speed can be used to both start and operate the conveyor rather than having to use a larger motor.

It is therefore a primary object of this invention to provide an apparatus for starting an oscillating conveyor with a minimum of power.

Another object of this invention is to provide an apparatus for starting an electric motor driven oscillating conveyor which will require a minimum of electric power during starting.

A further object of this invention is to provide a motor controller for an oscillating conveyor which after attempting and failing to start the conveyor in one direction will automatically attempt to start it in the opposite direction in a manner to release the energy stored in the reactor elements during the first attempted start and use this energy to aid the motor in starting the conveyor in the opposite direction.

Still a further object of this invention is to provide an improved drive mechanism for an oscillating conveyor which after developing reactor forces will release them in a direction to aid the drive mechanism in starting the conveyor with a minimum of electric power.

Still a further object of this invention is to provide an apparatus for starting an electric motor driven oscillating conveyor which eliminates the need for power-factor correction equipment.

Other objects and advantages of this invention will be apparent during the course of the following description.

BRIEF DESCRIPTION OF THE DRAWINGS

In the accompanying drawings forming a part of this specification and in which like reference characters are employed to designate like parts throughout the same.

DESCRIPTION OF THE PREFERRED EMBODIMENT

Figure 1:
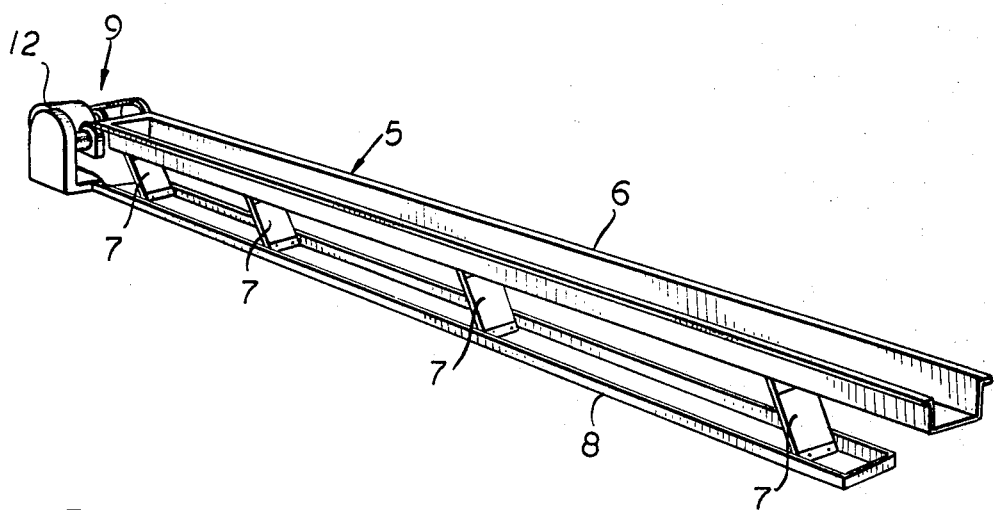
FIGURE 1 is a perspective view illustrating a motor driven oscillating conveyor.

In the drawings, wherein for the purpose of illustration is shown a preferred embodiment of this invention, and first particularly referring to FIG. 1, there is generally shown an oscillating conveyor trough assembly 5 having a conveyor trough 6 supported on a longitudinally spaced series of reactor elements 7 which are mounted on a base 8. Oscillation of the trough 6 causes the flexing of the reactor elements 7 so as to apply a reactive force in a direction to balance the forces developed by the trough and the material supported thereon.

A drive assembly 9 is mounted adjacent one end of the trough 6 and includes a drive arm, not shown, which has one end pivotally connected to the trough and the opposite end rotatably mounted on an eccentric drive shaft, not shown. The drive shaft is rotatively driven by an electric motor 12 to cause reciprocating movement of the drive arm in a vertical plane so as to impart oscillatory movement to the trough 6.

Figure 2:
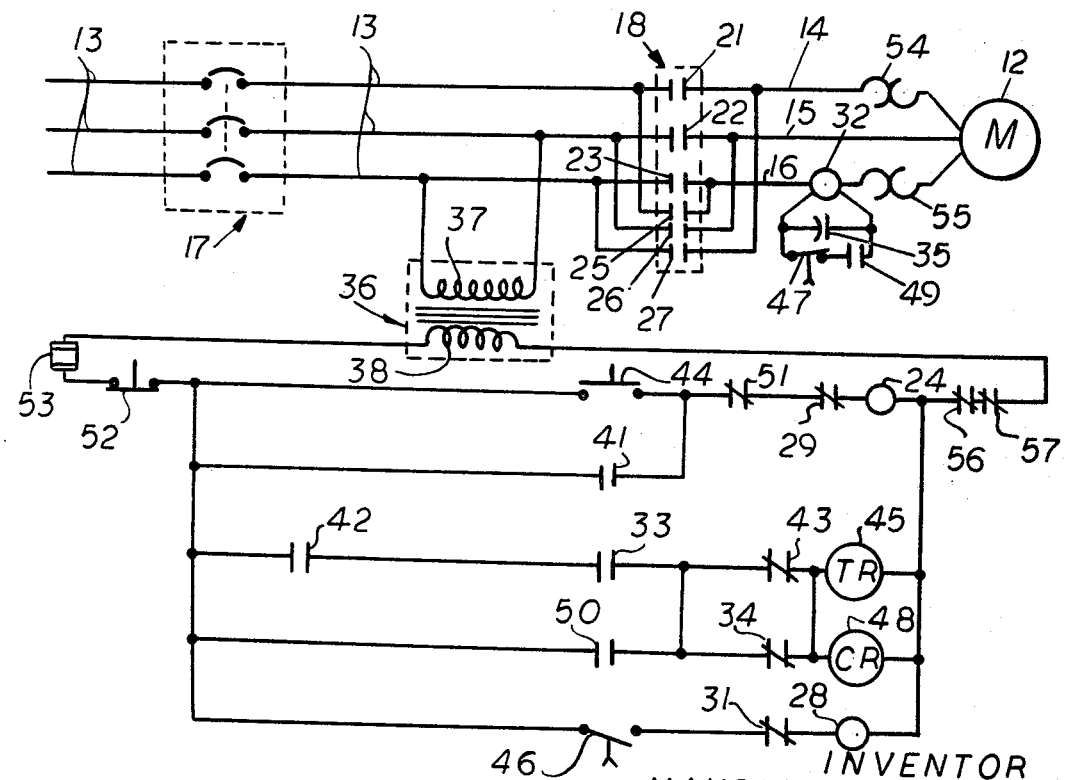
FIGURE 2 is a wiring diagram of a preferred electrical circuit for controlling the motor employed to operate the conveyor.

Referring to FIG. 2, the motor 12 is shown as a three-phase reversible electric motor, but it is to be understood that any reversible electric motor of either single or multi-phase having sufficient power to properly operate the conveyor trough assembly 5 could be utilized. It is to be noted that FIG. 2 shows the various components of the control system as they would be found prior to the energization of the circuit. The motor 12 is connected to a power source 13 in the conventional manner using conductors 14, 15, and 16 for transmitting the three phase current to the motor. A circuit interrupting switch 17 is interposed in the power source 13 and is electrically connected so that opening the switch will interrupt the power transmitted to both the motor circuit and the control circuit.

A motor controller 18 is connected between the power source 13 and the conductors 14, 15 and 16 for controlling the starting, stopping, and reversing operations of the motor 12. The controller 18 has a first bank of three normally open switches 21, 22, and 23 which are actuated by a solenoid coil 24, and a second bank of three normally open switches 25, 26, and 27 which are actuated by a solenoid coil 28, each bank of switches being operated in a manner to open and close all its switches in unison. Switches 21, 22, and 23 are arranged such that closing these switches will effect the starting of the motor 12 in the forward direction, whereas switches 25, 26, and 27 are arranged such that closing these switches reverses the connections of the conductors 14 and 16 to the power source 13 thereby reversing the polarity of the motor to cause it to rotate in the opposite or reverse direction.

The motor controller 18 is provided with an electrical interlock consisting of the normally closed switches 29 and 31 which acts to prevent the simultaneous closing of the two banks of switches 21, 22, 23, and 25, 26, 27. Switch 29 is connected in series with the coil 24 and is actuated by the coil 28, and switch 31 is connected in series with the coil 28 and is actuated by the coil 24. In this manner it is seen that upon energization of coil 24, switch 31 is opened and the circuit to coil 28 is thus interrupted preventing energization of the coil 28. Similarly, upon energization of coil 28, switch 29 is opened and interrupts the circuit to coil 24 to prevent energization thereof.

A current sensitive relay having an operating coil 32 is interposed in the conductor 16 so as to be in series with one phase of the motor 12, the operating coil being excited proportionally with the current passing through that phase of the motor. The inclusion of this relay permits the control circuit to discriminate between a condition where the motor 12 is started and runs properly with a corresponding decrease of motor current, and a condition where the motor is started and stalls with a corresponding increase of motor current. When the coil 32 becomes operatively excited, it operates to close a normally open switch 33 while simultaneously opening a normally closed switch 34, the functions of these switches being discussed later in this application. A capacitor 35 is connected with the coil 32 such that the coil will not become operatively excited until the capacitor has been sufficiently charged. This prevents the actuation of the switches 33 and 34 until after a short predetermined period of time has passed after the motor 12 has been energized. This period of time delay is greater than the time normally required for the motor 12 to start, and in this manner allows for the high starting inrush current drawn by the motor during its starting cycles without having this current operatively excite the coil 32. Should the conveyor trough assembly 5 start oscillating and continue to do so, the inrush current will be quickly diminished to the normal motor running current before the capacitor 35 has been sufficiently charged to permit the energization of the coil 32 to actuate switches 33 and 34. If, however, the conveyor trough assembly 5 fails to start, the motor 12 will stall and continue to draw the high inrush current. This condition permits the predetermined time delay period to lapse, the capacitor 35 reaches the proper charge, and the coil 32 becomes operatively energized and actuates the switches 33 and 34. This in turn effects the reversal of the direction of rotation of the motor 12 in a manner which is described in detail later in this application.

The control circuit is powered by a step-down transformer 36 which has its primary winding 37 connected between two of the conductors of the power source 13, and its secondary winding 38 connected to supply the power for energizing the various components of the control circuit. It is to be understood that the transformer 36 is only required where the power source 13 is of a voltage potential other than that specified for use with the control circuit components, and that when the voltage specified for operating the motor and the control circuit is the same, then the transformer may be omitted from the control circuit and the control circuit connected directly to the power source.

The coil 24 is operatively connected to actuate a pair of normally open switches 41 and 42 such that energization of the coil 24 to close the bank of switches 21, 22, and 23 will simultaneously close the switches 41 and 42. The switch 41 is connected in parallel with a normally open start switch 44 so that closing switch 41 will by-pass the start switch to maintain the completed electrical circuit after the start switch 44 has been momentarily closed and then returned to its normally open position. The coil 28 is operatively connected to actuate a normally closed switch 43 which is connected in series with the switches 33 and 42 such that energization of the coil 28 to close the switches 25, 26, and 27 will simultaneously open the switch 43.

A timing relay coil 45 is operatively connected to simultaneously actuate a normally open switch 46 and a normally closed switch 47 after a predetermined period of time has passed after the coil 45 has been energized. The switch 46 is connected in series with the switch 31 so that both switches must be in the closed position in order to energize the coil 28. Upon the deenergization of the coil 45, the switches 46 and 47 return to their normal positions with no time delay involved.

A control relay coil 48 is operatively connected to actuate normally open switches 49 and 50 while simultaneously actuating a normally closed switch 51. The switch 49 is connected in series with the switch 47, and the series connection is in parallel with the capacitor 35. In this manner the capacitor 35 is charged when either or both of the switches 47 and 49 are in the open position, and is discharged and shunted out of the circuit whenever both of the switches 47 and 49 are in the closed position. A stop switch 52 is connected in series with the start switch 44 and is normally biased in the closed position.

In a mechanism of the nature described above it is desirable to provide protective devices for protecting the circuit and its components against an overvoltage condition. A suitable fuse 53 is provided in the control circuit for this purpose. In addition, a pair of thermoresponsive elements 54 and 55 are interposed in conductors 14 and 16, respectively, and are operatively connected with a pair of normally closed switches 56 and 57 so as to open either or both of these switches in the case of an overload in the motor circuit. By placing the switches 56 and 57 in series with the stop switch 52, opening of either switch will open the circuit and stop the motor 12 in the same manner as the stop switch.

The operation is as follows: To start the motor 12 the current interrupting switch 17 is closed and the start switch 44 is momentarily closed. This completes a circuit from one end of the secondary winding 38 through the fuse 53, stop switch 52, start switch 44, switches 51 and 29, coil 24, and switches 56 and 57 to the other end of the secondary winding. This circuit energizes the coil 24 which in turn closes the switches 21, 22, 23, 41, and 42 while simultaneously opening the interlock switch 31. The closing of the bank of switches 21, 22, and 23 energizes the motor 12 in the forward direction, and the closing of switch 41 shunts out the start switch 44 so that the circuit remains completed after the start switch is released. The inrush starting current to the motor 12 begins charging the capacitor 35, the value of the capacitor being selected such that it prevents the operable excitation of the coil 32 until after the capacitor has reached a selected charge level. In this manner the coil 32 is prevented from actuating the switches 33 and 34 during the period of time it takes for the motor 12 to start and the corresponding inrush current to decrease below the current sensitivity setting required to energize the coil 32. If the motor 12 starts the conveyor trough assembly 5 oscillating, then the inrush current to the motor rapidly diminishes to the normal motor running current before the capacitor 35 is sufficiently charged to permit the operable excitation of the coil 32 and the corresponding actuation of the switches 33 and 34. The motor 12 will now continue to operate until manually stopped by momentarily depressing the stop switch 52.

Should the energization of the motor 12 in the forward direction fail to start the conveyor trough assembly 5 oscillating, the motor will stall and continue to draw the high starting inrush current from the power source 13. This will allow sufficient time for the capacitor 35 to become charged to its selected value and permit the operative excitation of the coil 32 to operate switches 33 and 34, closing the former and opening the latter. The closing of switch 33 completes a circuit from one end of the secondary winding 38, through the fuse 53, stop switch 52, switches 42, 33, and 43, parallelly connected coils 45 and 48, and switches 56 and 57 to the other end of the secondary winding. This circuit energizes the parallel connected timing relay coil 45 and control relay coil 48. The timing relay coil 45 is adjusted for a selected time delay period so as not to actuate its associated switches 46 and 47 until a short period of time after the control relay coil 48 has been energized and its associated switches actuated. Energization of the control relay coil 48 opens the switch 51 and closes the switches 49 and 50. Opening switch 51 deenergizes the coil 24 thereby closing the interlock switch 31 while simultaneously opening switches 21, 22, 23, 41, and 42. Opening the bank of switches 21, 22, and 23 disconnects the conductors 14, 15, and 16 from the power source 13 to stop the motor 12, and simultaneously deenergizes the current sensitive coil 32 to open the switch 33 and close the switch 34. The series combination of the closed switches 47 and 49 in parallel with the capacitor 35 shunts out the capacitor and discharges it.

The timing relay coil 45 now operates to open switch 47 to again permit charging of the capacitor 35 while simultaneously closing switch 46 which is connected in series with the now closed switch 31 and coil 28. This completes a circuit which energizes the coil 28 which in turn closes the bank of switches 25, 26, and 27 and simultaneously opens the switches 29 and 43. The closing of the bank of switches 25, 26, and 27 reverses the connections of the conductors 14 and 16 to the power source 13 thereby reversing the polarity of the motor 12 to cause it to rotate in the opposite direction. The current sensitive relay coil 32 and capacitor 35 operate in the same manner as previously described, and should the motor 12 now start the conveyor trough assembly 5 oscillating it will continue to operate until manually stopped by opening the stop switch 52.

If, however, the motor 12 again fails to start the conveyor trough assembly 5 oscillating, then the motor will stall and continue to draw the high inrush current from the power source 13. This will permit the capacitor 35 to charge to the value required for operatively energizing the current sensitive relay coil 32 to close the switch 33 and open the switch 34. Opening switch 34 deenergizes the timing relay coil 45 which in turn opens switch 46 to deenergize the coil 28, and closes switch 47 to shunt out and discharge the capacitor 35. The opening of switch 34 also deenergizes the control relay coil 48 thereby closing the switch 51 and opening the switches 49 and 50. It should be noted that the timing relay coil 45 actuates its associated switches prior to the control relay coil 48 actuating its associated switches due to the design of the respective relays. Deenergizing the coil 28 opens the bank of switches 25, 26, and 27 causing a stoppage of the motor 12 and the deenergization of the coil 32. Consequently, all of the controls have now returned to their original positions and the operation of the motor 12 has been terminated. To repeat the above described automatically controlled starting sequence, the start switch 44 must again be manually closed after which the above described sequence of events will be automatically repeated.

It is understood that the form of this invention herewith shown and described is to be taken as a preferred example of the same, and that various changes in shape, size, and arrangement of parts may be resorted to without departing from the spirit of the invention or the scope of the subjoined claims.

Having thus described the invention, I claim:

1. Oscillatory conveying apparatus comprising:
material carrying means resiliently supported for oscillatory movement;
powered means drivingly connected to the carrying means;
reactor means operatively associated with the carrying means for alternatively accumulating and delivering energy to the carrying means; and
means responsive to a predetermined overload of the powered means for automatically effecting the reversal thereof so as to release the energy initially accumulated in the reactor means in a direction to aid the powered means drive the carrying means.

2. Apparatus as defined in claim 1 further characterized by:
means responsive to an overload of the powered means after the reversal thereof for terminating the operation of the powered means.

3. In combination with a vibrating mechanism having a material carrying member supported for oscillating motion:
a reactor element connected to the material carrying member for alternately accumulating and delivering energy to the carrying member;

an electric motor drivingly connected to the material carrying member;

means for energizing the motor for rotation in an initial direction;

reversing means for automatically effecting the reversal of the motor upon its stalling while energized to operate in the initial direction so as to release the energy initially accumulated in the reactor element in a direction to aid the motor by delivering an energy impulse to the material carrying member; and means for automatically terminating the operation of the motor upon its stalling while energized to operate in the reverse direction.

4. Apparatus as defined in claim 3 wherein the reversing means includes an electromagnetically operated switching device having an electromagnetic operating coil connected in series relation with the motor and operated responsively to a selectable value of motor current for actuating the switching device.

5. Apparatus as defined in claim 3 further characterized by time delay means for rendering the reversing means and terminating means temporarily inoperative during the initial starting of the motor in either direction to allow for the starting inrush current of the motor.

6. In combination with a material supporting member resiliently mounted for oscillatory movement, a drive mechanism comprising:

a reversible electric motor;

means drivingly connecting the motor to the material supporting member;

a switch mechanism having a pair of separately operable electromagnetic control switches for selectively connecting the motor to a source of electrical energy, operation of one of the control switches being arranged to effect energization of the motor in a forward direction with the other control switch arranged to effect energization of the motor in the reverse direction;

means for energizing the first mentioned control switch; and means electrically connected to the motor and responsive to stalled motor current for sequentially de-energizing the first mentioned control switch in the event the motor stall when initially energized in the forward direction, for energizing the second mentioned control switch to effect reversal of the motor, and for deenergizing the second mentioned control switch to terminate the operation of the motor in response to stalling of the motor in the reverse direction.

7. Apparatus for exciting a spring-mass system comprising:

a material carrying member;

reactor elements resiliently supporting the material carrying member;

drive means connected to the material carrying member; and means responsive to a predetermined overload of the drive means upon its applying an initial force to the spring-mass system for automatically effecting the reversal of the drive means so as to release the energy accumulated in the reactor elements during the application of the initial force in a direction to aid the drive means in operating in the reverse direction.

8. Apparatus as defined in claim 7 further characterized by the predetermined overload being selected to cause the operation of the reversing means upon the stalling of the drive means when the forces developed by the reactor element and drive means are balanced within the spring-mass system.

9. Apparatus for exciting a one degree of freedom spring-mass comprising:

a material carrying member resiliently supported for oscillatory movement;

reactor elements connected to the material carrying member;

a reversible electric motor drivingly connected to the material carrying member;

means for energizing the motor in an initial direction to impart an initial force to the material carrying member for effecting the displacement thereof from an initial position to a displaced position so as to increase the energy of the spring-mass system by an amount substantially proportional to the displacement of the system; and means responsive to stalling of the motor when the motor has imparted its maximum initial force to the system to effect the displacement thereof for effecting the reversal of the motor to impart a force to the material carrying member in a direction opposed to the initial force and to release the reactive forces initially stored in the reactor elements during the application of the initial force so as to aid the motor in exciting the spring-mass system.

References Cited

UNITED STATES PATENTS

| 2,548,709 | 4/1951 | Drexler | 198—110 X |
| 2,947,410 | 8/1960 | Carrier | 198—220 |
| 3,005,540 | 10/1961 | Hinderaker | 198—232 |
| 3,122,666 | 2/1964 | Guiot | 310—41 |

FOREIGN PATENTS 162,448  9/1964  U.S.S.R.

EVON C. BLUNK, *Primary Examiner.*

R. J. HICKEY, *Assistant Examiner.*